3,027,484
PERIODIC MAGNETIC FOCUSSING SYSTEM FOR TRAVELLING WAVE TUBES
Takahiko Misugi, Tanida Hayashi, Akashi-shi, Hyogo-ken, and Tatsuo Miyagawa, Nagata-ku, Kobe-shi, Hyogo-ken, Japan, assignors to Kobe Kogyo Kabushiki Kaisha, Kobe-shi, Hyogo-ken, Japan, a corporation of Japan
Filed Mar. 25, 1959, Ser. No. 801,931
Claims priority, application Japan Mar. 29, 1958
2 Claims. (Cl. 315—3.5)

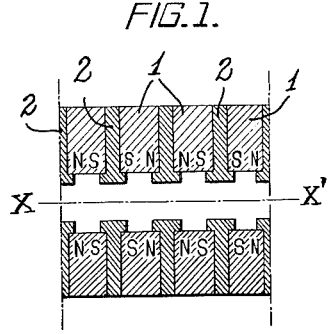
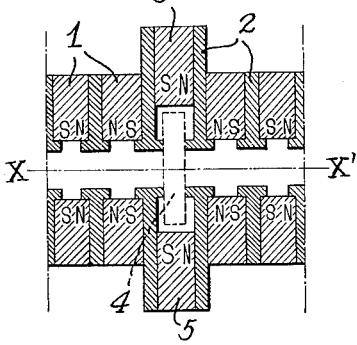
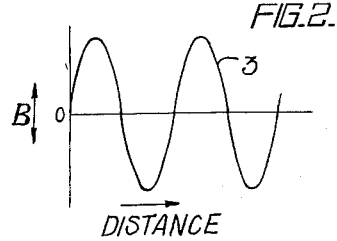
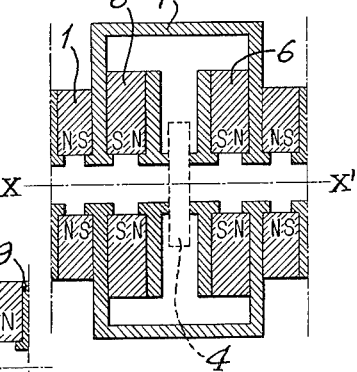
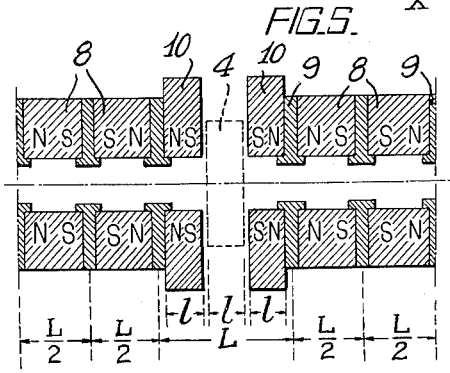
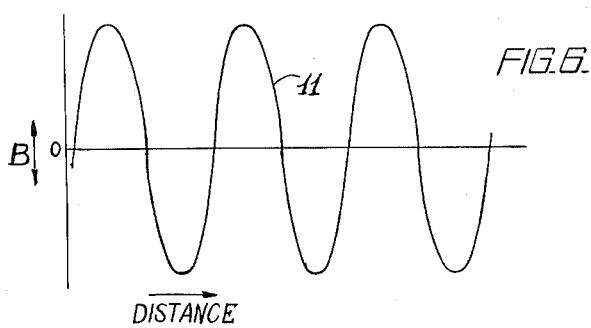

Present invention relates to a periodic magnetic focussing system for travelling wave tubes, more particularly, an improvement of a periodic magnetic focussing system for travelling wave tubes which comprises a thin and long helical electrode, and a plurality of magnetic elements arranged along the electrode in series thereby to form a straight electron beam along said helical electrode. In a travelling wave tube of the type as described above for forming straight electron beams, it is necessary to provide a wave guide which is connected to the electrode in the tube so as to introduce R.F. energy into and to pick up R.F. energy from the travelling wave tube. The part where the wave guide is inserted in the tube must have somewhat different construction from the other part of the tube, and continuous similar arrangement of the magnetic elements is interrupted at the place of the insertion of the wave guide thereby disturbing regular distribution of the magnetic flux in the magnetic field and consequently affecting the focussing action of the magnetic field. One of the objects of the present invention is to eliminate the disadvantage as described above.

Another object of the invention is to provide a periodic magnetic focussing system which is compact and small but can achieve the elimination of the undesirable effect of the insertion of the wave guide.

Still another object of the present invention is to provide a periodic magnetic focussing system which does not require to adjust its magnetic field requiring much care and attention.

The features and advantages of the periodic magnetic focussing system will be made clear as the explanation of the invention made hereafter with reference to accompanying drawings proceeds. In the drawings, FIG. 1 is a longitudinal sectional view of a periodic magnetic focussing system of conventional construction;

FIG. 2 is a curve illustrating the intensity of the magnetic field formed by the magnetic focussing system as illustrated in FIG. 1 taken along the axis of a travelling wave tube;

FIG. 3 is the longitudinal sectional view of one of the arrangements of magnetic elements of heretofore illustrating the part where a wave guide is inserted;

FIG. 4 is a similar view as FIG. 3 of another arrangement of magnetic elements of heretofore;

FIG. 5 is the longitudinal sectional view of the periodic magnetic focussing system according to the present invention, illustrating the part where a wave guide is inserted; and FIG. 6 is a curve showing the intensity of the magnetic field formed by the magnetic focussing system as illustrated in FIG. 5 taken along the axis of a travelling wave tube.

In a travelling wave tube, it is necessary to provide a magnetic focussing system in order to obtain a straight electron beam along its slender and long helical electrode. For the magnetic focussing system for the purpose as described above, a system as illustrated in FIG. 1 is used as one of such systems. In the drawing, only the magnetic focussing system is illustrated, for the sake of simplification, removing away the tube, electrodes, electron beam and others of a travelling wave tube which are not needed for the explanation of the present invention. In the drawing X—X' represents the axis of the electron beam and around this axis are arranged permanent magnets 1 and magnetic pole pieces 2 alternatively as shown in the drawing. It is evident that a periodic magnetic field having the distribution of magnetic flux along the axis X—X' as illustrated in FIG. 2 is formed with the arrangement of the magnetic elements as above described.

If the magnetic field as described above can be used from the beginning to the terminal of the electron beam, it can achieve the best focussing action for the electron beam, but at the point of input and the point of output, it is necessary to insert a wave guide in the travelling wave tube and to connect said wave guide to the helical electrode in the tube and hence it is impossible at these places to have the same constructions as other parts. This insertion causes discontinuity of the arrangement of magnetic elements and disturbs the magnetic field thereby interfering with good focussing action of the system.

There have been proposed various apparatuses for overcoming the difficulty as described above. Among them, the most representative ones are the arrangements as illustrated in FIG. 3 and FIG. 4.

In FIG. 3, permanent magnets 1 and magnetic pole pieces 2 are generally arranged similarly to FIG. 1, but at the place where a wave guide 4 is inserted, the permanent magnet 5 is placed at a greater distance from the axis X—X' and is made larger than other permanent magnets 1. As the result the distribution of the magnetic flux along the axis X—X' will be made substantially same as in the curve of FIG. 2. However, it is unavoidable to make the size large at the place of the specific permanent magnet 5 because of its position and larger size. This is a great drawback for a travelling wave tube which must be of small size.

In FIG. 4, the permanent magnet in the place of the insertion of the wave guide 4 is taken off, and the permanent magnets 6 adjoining the wave guide 4 are made larger than other permanent magnets 1 and further a cylindrical shield 7 is arranged to cover the greater permanent magnets 6 as illustrated in the drawing. This is so-called one-magnet-off-shield type. It is important in this system to select a cylindrical shield 7 of adequate permeability which can be attained only with much care and labor. This type has also disadvantage in making the size relatively large because of the bigger size of the permanent magnets 6 and the presence of the cylindrical shield 7.

The magnetic focussing system of the present invention is different from either of the conventional systems. In the above mentioned systems, the pitch of each of the permanent magnets is made equal to the width of the wave guide, the pitch and the width being taken along the longitudinal axis of the tube. In contrast, in the present invention, as shown in FIG. 5, permanent magnets 10 adjoining the wave guide 4 have the same width as the wave guide 4, but each of other two permanent magnets 8 on opposite sides of the wave guide 4 has a width substantially equal to about 3/2 l. respectively, and magnetic pole pieces 9 are inserted between permanent magnets as shown in the drawing. The permanent magnet in the place where the wave guide 4 is inserted is removed as in the type of FIG. 4 but no cylindrical tube 7 is used. The permanent magnets 10 adjoining the wave guide 4 is a little larger than other permanent magnets 8 but they are not placed at a greater distance as in the case of the permanent magnet 5 of FIG. 3. Accordingly it is apparent the periodic magnetic focussing system of the present invention can be made more compact and small than either of the systems of FIG. 3 and FIG. 4. It will be evident that the distribution of the magnetic flux along the axis X—X' as shown by the curve in FIG. 6 which is similar to the curve of FIG. 2 can be obtained with the system as described above.

It is true that it is difficult to make the relations between the wave guide 4 and permanent magnets 10 and 8 exactly as described above because of the presence of the magnetic pole pieces 9 and some clearances, but for the practical purpose the inaccuracy which may be caused is so little that it will not cause any appreciable disturbance in attaining the object of the present invention.

What we claim is:

1. A periodic magnetic focussing system for a tube having a longitudinal axis, said system comprising a wave guide of determinable width relative to the longitudinal axis of said tube, a pair of permanent magnets located on opposite sides of the wave guide, the sum of the widths of said wave guide and said pair of permanent magnets being substantially three times the width of said wave guide a plurality of permanent magnets having a width in the same direction as that of and equal to about three halves the width of the wave guide and arranged outwardly of the first said permanent magnets, and magnetic pole pieces inserted between the permanent magnets, all of said magnets being arranged along and surrounding the longitudinal axis of said tube whereby results a magnetic field having a period substantially equal to three times the width of the wave guide, said pair of permanent magnets being arranged to present to each other surfaces of the same magnetic polarity.

2. A periodic magnetic focussing system for a travelling wave tube having a longitudinal axis, said system comprising a wave guide of determinable width relative to the longitudinal axis of the tube, a pair of permanent magnets having a width substantially equal to the width of said wave guide and located on opposite sides of said wave guide, a plurality of permanent magnets having a width in the same direction as that of and equal to about three halves the width of said wave guide and arranged outwardly of the said pair of permanent magnets, magnetic pole pieces inserted between the permanent magnets, all of said permanent magnets being arranged along and surrounding the longitudinal axis of said travelling wave tube to provide a magnetic field having a period substantially equal to three times the width of said wave guide, said pair of permanent magnets being arranged to present to each other surfaces of the same magnetic polarity.

References Cited in the file of this patent

UNITED STATES PATENTS

| | | |
|---|---|---|
| 2,602,148 | Pierce | July 1, 1952 |
| 2,632,130 | Hull | Mar. 17, 1953 |
| 2,812,470 | Cook et al. | Nov. 5, 1957 |
| 2,844,750 | Veith et al. | July 22, 1958 |
| 2,847,607 | Pierce | Aug. 12, 1958 |
| 2,882,439 | Nishio et al. | Apr. 14, 1959 |
| 2,945,153 | Chang | July 12, 1960 |

FOREIGN PATENTS

| | | |
|---|---|---|
| 762,106 | Great Britain | Nov. 21, 1956 |